United States Patent
Ramaswamy

(10) Patent No.: US 6,571,112 B1
(45) Date of Patent: May 27, 2003

(54) METHOD AND APPARATUS FOR PROCESSING AN EMBEDDED MESSAGE AT A WIRELESS MOBILE STATION WHICH INCLUDES A SUBSCRIBER IDENTITY MODULE

(75) Inventor: Satyanarayanan Ramaswamy, Wheeling, IL (US)

(73) Assignee: Motorola, Inc., Schaumburg, IL (US)

(*) Notice: Subject to any disclaimer, the term of this patent is extended or adjusted under 35 U.S.C. 154(b) by 286 days.

(21) Appl. No.: 09/631,817

(22) Filed: Aug. 3, 2000

(51) Int. Cl.⁷ .......................... H04Q 7/20; H04M 3/42; H04J 3/12; G06F 17/50; G06G 7/62

(52) U.S. Cl. ...................... 455/966; 455/415; 370/522; 703/17

(58) Field of Search ................................. 455/466, 415; 370/522; 703/17

(56) References Cited

U.S. PATENT DOCUMENTS

| | | | |
|---|---|---|---|
| 6,061,346 A | | 5/2000 | Nordman |
| 6,094,575 A | * | 7/2000 | Anderson et al. ........... 455/415 |
| 6,104,929 A | | 8/2000 | Josse et al. |
| 6,122,293 A | | 9/2000 | Frodigh et al. |
| 6,134,514 A | * | 10/2000 | Liu et al. ...................... 703/17 |
| 6,167,279 A | | 12/2000 | Chang et al. |
| 6,201,974 B1 | | 3/2001 | Lietsalmi et al. |
| 6,243,579 B1 | | 6/2001 | Kari |
| 6,320,873 B1 | | 11/2001 | Nevo et al. |
| 6,408,063 B1 | * | 6/2002 | Slotte et al. ................. 370/522 |
| 6,480,717 B1 | | 11/2002 | Ramaswamy |

OTHER PUBLICATIONS

Technical Specification TS 100 900 V6.0.1 (Jul. 1998), "Digital cellular telecommunications system (Phase 2+); Alphabets and language–specific information (GSM 03.38 version 6.0.1 Release 1997)", GSM Global System For Mobile Communications, 20 pages.

Technical Specification ETSI TS 100 900 V7.2.0 (Jul. 1999), "Digital cellular telecommunications system (Phase 2+); Alphabets and language–specific information (GSM 03.38 version 7.2.0 Release 1998)", GSM Global System For Mobile Communications, 20 pages.

Technical Specification 3GPP TS 04.64 V8.7.0 (Dec. 2001), "3rd Generation Partnership Project; Technical Specification Group Core Network; Digital cellular telecommunications system (Phase 2+); General Packet Radio Service (GPRS); Mobile Station—Serving GPRS Support Node (MS–SGSN) Logical Link Control (LLC) layer specification (Release 1999)", GSM Global System For Mobile Communications, 5 pages.

Technical Specification 3GPP TS 23.060 V3.14.0 (Dec. 2002), "3rd Generation Partnership Project; Technical Specification Group Services and System Aspects; General Packet Radio Service (GPRS); Service Description; Stage 2 (Release 1999)", GSM Global System For Mobile Communications, 2 pages.

European Telecommunication Standard ETS 300 901, "Digital cellular telecommunications system (Phase 2+); Technical realization of the Short Message Service (SMS); Point–to–Point (PP) (GSM 03.40 version 5.8.1 Release 1996)", Dec. 1998, 5th Ed., pp. 49–51.

\* cited by examiner

*Primary Examiner*—William Cumming
(74) *Attorney, Agent, or Firm*—Sylvia Chen; Roland K. Bowler, II

(57) ABSTRACT

A method and apparatus for processing embedded messages at a mobile station including a subscriber identity module (SIM) identifying the subscriber, for example, a GSM or a non-GSM wireless telephone. The process includes receiving a message having a protocol identifier, transferring at least a portion of the message to the subscriber identity module if the protocol identifier satisfied a condition, extracting information from the at least portion to of the message at the subscriber identity module if a protocol identified by the protocol identifier is supported by the subscriber identity module.

20 Claims, 3 Drawing Sheets

METHOD AND APPARATUS FOR PROCESSING AN EMBEDDED MESSAGE AT A WIRELESS MOBILE STATION WHICH INCLUDES A SUBSCRIBER IDENTITY MODULE

TECHNICAL FIELD OF THE INVENTION

The present invention relates in general to an apparatus and method for processing wireless telephone call messages and in particular to an apparatus and method for processing an embedded message at a mobile station which includes a subscriber identity module.

BACKGROUND OF THE INVENTION

In order to offer wireless telephone subscribers increased coverage and functionality, many otherwise incompatible wireless systems are converging. For example, the convergence of TIA/EIA-136 and Global System for Mobile Communication (GSM) technologies is taking place through the use of the GSM GPRS protocol and through network nodes in TIA/EIA-136 networks. Multi-mode mobile stations may be used that are able to function on either a TIA/EIA-136 network or on a GSM network. When either the GSM GPRS protocol stack is used by a TIA/EIA-136 mobile station to obtain packet services, or when a TIA/EIA-136 subscriber (as identified by his subscriber identity module or SIM card) is roaming in a GSM network, it is necessary to deliver native TIA/EIA-136 teleservice messages to the mobile station.

Providing such service to the mobile station is problematic because a non-GSM subscriber (e.g., a TIA/EIA-136 subscriber as identified by his SIM card) could be using either a GSM mobile station or a non-GSM mobile station. Further, some of the non-GSM teleservices that are to be delivered to the subscriber may require processing by the mobile station. For example, a non-GSM teleservices may require processing power available in the mobile station, but not available in the SIM card.

SUMMARY OF THE INVENTION

In one aspect, the invention is directed to a method for processing an embedded message at a mobile station. The mobile station includes a subscriber identity module. The mobile station receives an encapsulating message which includes an embedded message. The mobile station then determines if a protocol identifier included in the encapsulating message is a predetermined protocol identifier. If the protocol identifier is the predetermined protocol identifier, the mobile station transfers the encapsulating message to the subscriber identity module. The subscriber identity module then determines if the particular protocol identified by the protocol identifier is supported by the subscriber identity module. If the particular protocol is supported by the subscriber identity module, the subscriber identity module extracts the embedded message from the encapsulating message and process the embedded message.

In another aspect, the invention is directed to a method for processing an embedded message at a mobile station. The mobile station includes a subscriber identity module. The mobile station receives an encapsulating message which includes a protocol identifier, a protocol discriminator, a subscriber identity module escape flag, and the embedded message. The mobile station determines if the protocol discriminator is indicative of a protocol supported by the mobile station. If the protocol discriminator is indicative of a protocol supported by the mobile station, the mobile station determines if the protocol identifier identifies a predetermined protocol. If the protocol identifier identifies the predetermined protocol, the mobile station determines if the subscriber identity module escape flag indicates a desire to transfer the encapsulating message to the subscriber identity module. If the subscriber identity module escape flag does not indicate a desire to transfer the encapsulating message to the subscriber identity module, the mobile station extracts and processes the embedded message.

In one embodiment, the mobile station transfers the encapsulating message to the subscriber identity module if the protocol discriminator is indicative of a protocol not supported by the mobile station. The subscriber identity module then determines if the particular protocol identified by the protocol identifier is supported by the subscriber identity module. If the particular protocol is supported by the subscriber identity module, the subscriber identity module extracts and processes the embedded message. In one embodiment, the mobile station transfers the encapsulating message to the subscriber identity module if the subscriber identity module escape flag indicates a desire to transfer the encapsulating message to the subscriber identity module. The subscriber identity module then determines if the particular protocol identified by the protocol identifier is supported by the subscriber identity module. If the particular protocol is supported by the subscriber identity module the subscriber identity module extracts and processes the embedded message.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

DETAILED DESCRIPTION OF THE PREFERRED EMBODIMENTS

In general, the system described herein provides a method and apparatus for processing an embedded message at a mobile station. The mobile station may be a Global System for Mobile Communication (GSM) or a non-GSM wireless telephone operating in a wireless communication environment as describe in detail in application Ser. No. 09/407,557 incorporated herein by reference.

The mobile station includes a subscriber identity module (i.e., a SIM card). The SIM card is a personalized phone card identifying the subscriber. The SIM card may be inserted in a GSM or a non-GSM wireless telephone. The embedded message is included in an encapsulating message. Some embedded messages are intended for processing by the mobile station. Other embedded messages are intended for processing by the SIM card which is inserted in the mobile station.

Preferably, the encapsulating message is a GSM compatible message. However, the embedded message may not be a GSM compatible message. For example, the embedded message may be a TIA/EIA-136 compatible message. Embedded messages intended for processing by the SIM card are passed on to the SIM card by the mobile station. Of course, a person of ordinary skill in the art will readily appreciate that the techniques described herein are equally applicable to systems employing other protocols.

Figure 1:
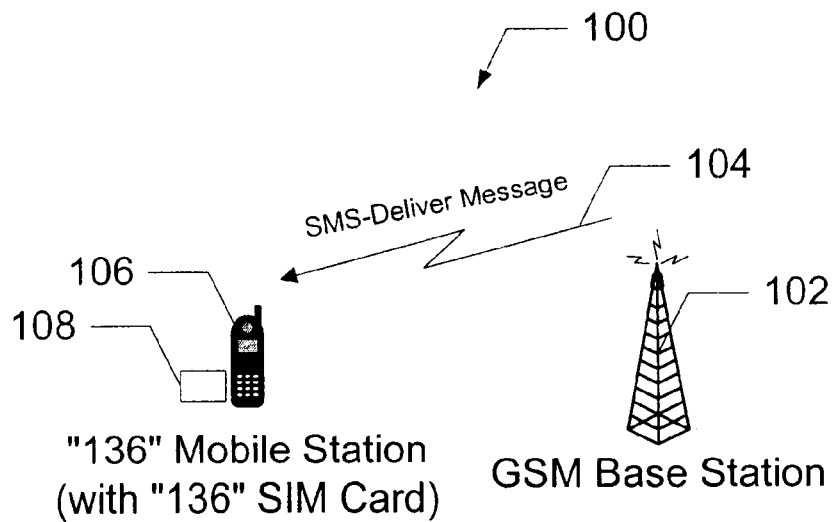
FIG. 1 is high level block diagram of a wireless communication system using a GSM base station and a non-GSM mobile station.

A high level block diagram of one such wireless system 100 is illustrated in FIG. 1. In this example, a GSM base station 102 is transmitting an encapsulating message 104 (e.g., an SMS-deliver message) to a non-GSM mobile station 106 (e.g., a TIA/EIA-136 mobile station). The mobile station 106 contains a non-GSM SIM card 108 (e.g., a TIA/EIA-136 SIM card).

Figure 2:
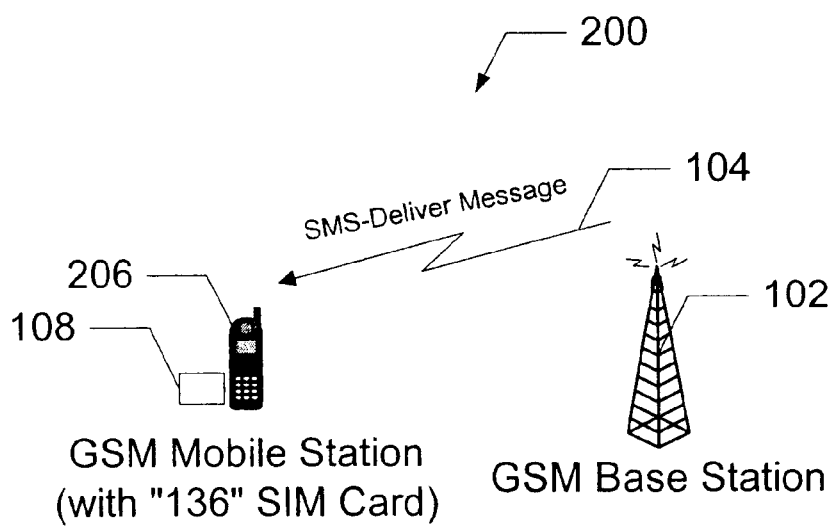
FIG. 2 is high level block diagram of a wireless communication system using a GSM base station and a GSM mobile station.

A high level block diagram of another wireless system 100 is illustrated in FIG. 2. In this example, a GSM base station 102 is transmitting an encapsulating message 104 (e.g., an SMS-deliver message) to a GSM mobile station 206. Even though the mobile station 206 in this example is a GSM mobile station, it contains a non-GSM SIM card 108 (e.g., a TIA/EIA-136 SIM card).

Figure 3:
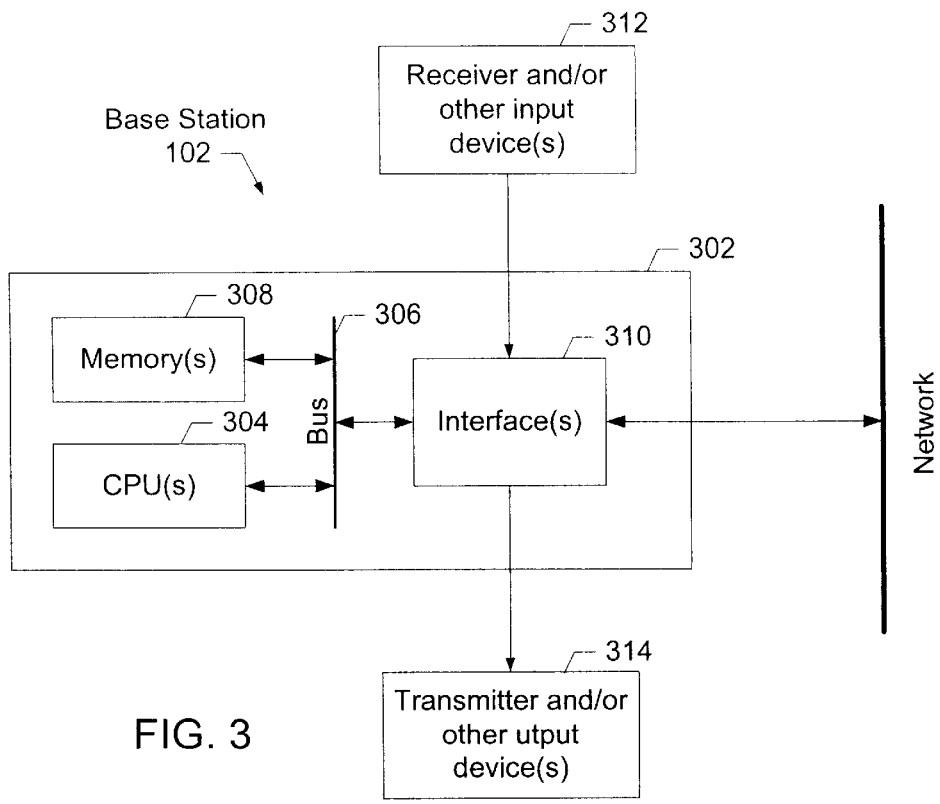
FIG. 3 is a more detailed block diagram of the mobile station illustrated in FIG. 1 and FIG. 2.

A more detailed diagram of the base station 102, is illustrated in FIG. 3. In a preferred embodiment, the base station 102 is a GSM cellular base station. However, the base station 102 may be any type of wireless communication system programmed to implement the method and/or apparatus of the present invention. A controller 302 in the base station 102 preferably includes a central processing unit (CPU) 304 electrically coupled by an address/data bus 306 to a memory device 308 and an interface circuit 310. The CPU 304 may be any type of well known CPU, such as an Intel Pentium™ processor. The memory device 308 preferably includes volatile memory, such as a random-access memory (RAM), and non-volatile memory, such as a read only memory (ROM) and/or a magnetic disk. The memory device 308 stores a software program that implements all or part of the method described below. This program is executed by the CPU 304, as is well known. However, some of the steps described in the method below may be performed manually or without to the use of the CPU 304.

A receiver 312 and a transmitter 314 are electronically coupled to the controller 302 via a conventional interface circuit 310. Preferably, the controller 302 receives time-division multiple access (TDMA) signals via the receiver 312. In response to certain received signals, the controller 302 generates TDMA signals and causes the transmitter 314 to transmit the TDMA signals. Of course, a person of ordinary skill in the art will readily appreciate that other types of signals may be transmitted and/or received in the scope and spirit of the present invention. For example, frequency-division multiple access (FDMA) signals and/or code-division multiple access (CDMA) signals may be used.

One or more input devices may also be connected to the interface circuit 310 for entering data and commands into the controller 302. For example, the input device 312 may be a keyboard, mouse, touch screen, track pad, track ball, isopoint, and/or a voice recognition system.

One or more output devices may also be connected to the controller 302 via the interface circuit 310. Examples of output devices include cathode ray tubes (CRTs), liquid crystal displays (LCDs), speakers, and/or printers. The output device may generate visual displays of data generated during operation of the base station 102. The visual displays may include prompts for human operator input, run time statistics, calculated values, and/or detected data.

Figure 4:
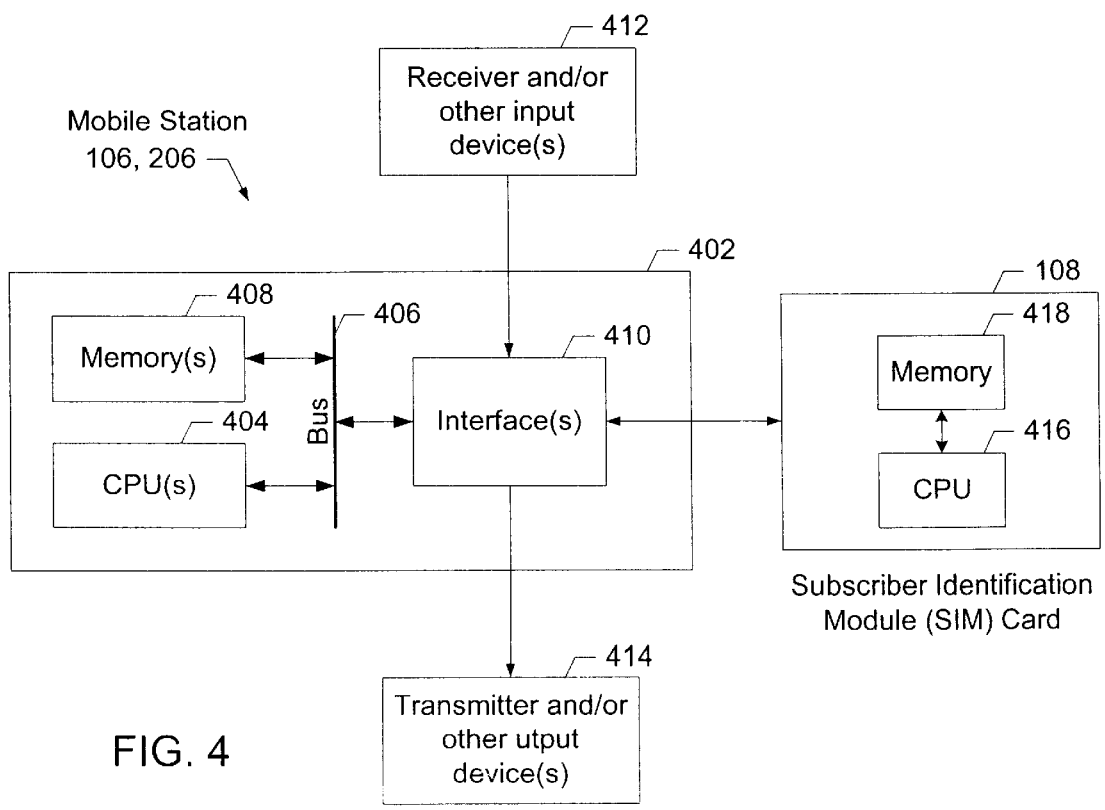
FIG. 4 is a more detailed block diagram of the base station illustrated in FIG. 1 and FIG. 2.

A more detailed diagram of the mobile station 106, 206, is illustrated in FIG. 4. In a preferred embodiment, the mobile station 106, 206 is a GPRS-136 cellular handset or a GSM cellular handset. However, the mobile station 106, 206 may be any type of wireless communication device programmed to implement the method and/or apparatus of the present invention. At a high level, the mobile station 106, 206 is similar to the base station 102 described above. A controller 402 in the mobile station 106, 206 preferably includes a central processing unit (CPU) 404 electrically coupled by an address/data bus 406 to a memory device 408 and an interface circuit 410. The CPU 404 may be any type of well known CPU, such as an Intel Pentium™ processor. The memory device 408 preferably includes volatile memory, such as a random-access memory (RAM), and non-volatile memory, such as a read only memory (ROM) and/or a magnetic disk. The memory device 408 stores a software program that implements all or part of the method described below. This program is executed by the CPU 404. However, some of the steps described in the method below may be performed manually or without the use of the CPU 404.

A receiver 412 and a transmitter 414 are electronically coupled to the controller 402 via a conventional interface circuit 410. Preferably, the controller 402 receives time-division multiple access (TDMA) signals via the receiver 412. In response to certain received signals, the controller 402 generates TDMA signals and causes the transmitter 414 to transmit the TDMA signals. Of course, a person of ordinary skill in the art will readily appreciate that other types of signals may be transmitted and/or received in the scope and spirit of the present invention. For example, frequency-division multiple access (FDMA) signals and/or code-division multiple access (CDMA) signals may be used.

One or more input devices may also be connected to the interface circuit 410 for entering data and commands into the controller 402. For example, the input device 412 may be a keyboard, mouse, touch screen, track pad, track ball, isopoint, and/or a voice recognition system.

One or more output devices may also be connected to the controller 402 via the interface circuit 410. Examples of output devices include cathode ray tubes (CRTs), liquid crystal displays (LCDs), speakers, and/or printers. The output device may generate visual displays of data generated during operation of the mobile station 106, 206. The visual displays may include prompts for human operator input, run time statistics, calculated values, and/or detected data.

In addition, the mobile station 106, 206 includes a subscriber identification module 108 (SIM card). The SIM card 108 is a personalized phone card identifying the subscriber. The SIM card 108 may be inserted in a GSM or a non-GSM wireless telephone. Preferably, the SIM card 108 includes its own central processing unit 416 (CPU) and memory 418. Often, the CPU 416 in the SIM card 108 is a different than the CPU 404 in the mobile station 106, 206. The CPU 416 in the SIM card 108 is capable of processing messages received by the receiver 412 completely independent of message processing by the CPU 404 in the mobile station 106, 206. However, in the preferred embodiment, the CPU 404 in the mobile station 106, 206 initially receives each message, such as an encapsulating message 104, from the receiver 412 and then, if necessary, transfers the message to the CPU 416 in the SIM card 108. Preferably, the memory 418 in the SIM card 108 is non-volatile memory such as FLASH memory. The SIM card 108 may communicate with the mobile station 106, 206 via the same interface circuit 410 described above and/or through any other type of well known interface.

Figure 5:
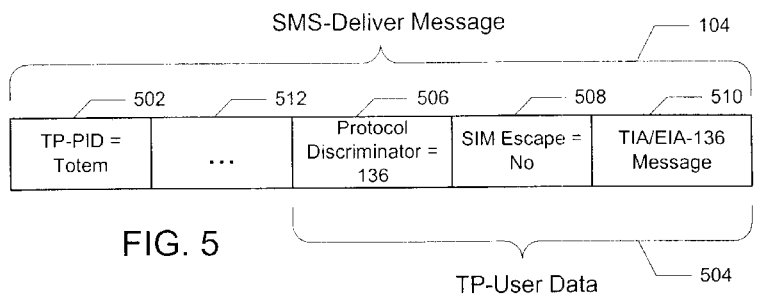
FIG. 5 is a block diagram of the SMS-Deliver message illustrated in FIG. 1 and FIG. 2.

A more detailed diagram of an encapsulating message 104 is illustrated in FIG. 5. In the preferred embodiment, the encapsulating message 104 is an SMS-deliver message 104. The SMS-deliver message 104 includes a protocol identifier field 502 (e.g., TP-PID). The protocol identifier field 502 may indicate that the SMS-deliver message 104 is using a user data portion 504 to deliver a non-GSM teleservice message using a tunneling of teleservice message protocol (i.e., TOTEM).

The user data portion 504 preferably includes a protocol discriminator 506. The protocol discriminator 506 is different than the protocol identifier 502. The protocol discriminator 506 indicates which non-GSM protocol is being used in the embedded message (e.g., TIA/EIA-136). The user data portion 504 may also include a SIM escape flag 508 and/or other data which may be used to indicate whether the mobile station 106, 206 should process the teleservice message or if the mobile station 106, 206 should pass the message on to the SIM card 108 for processing. However, the mobile station 106, 206 may pass the message on to the SIM card 108 for processing even when the SIM escape flag 508 is not set, as described in detail below. Although, for simplicity in explanation, a SIM escape flag 508 is used throughout this description, a person of ordinary skill in the art will readily appreciate that any field or combination of fields may be processed to determine if the mobile station 106, 206 should pass the message on to the SIM card 108 for processing. Finally, the user data portion 504 also includes the embedded message 510. For example, the user data portion 504 may include a TIA/EIA-136 embedded message 510. Of course, the encapsulating message 104 and/or the user data portion 504 may also include other data 512

Figure 6:
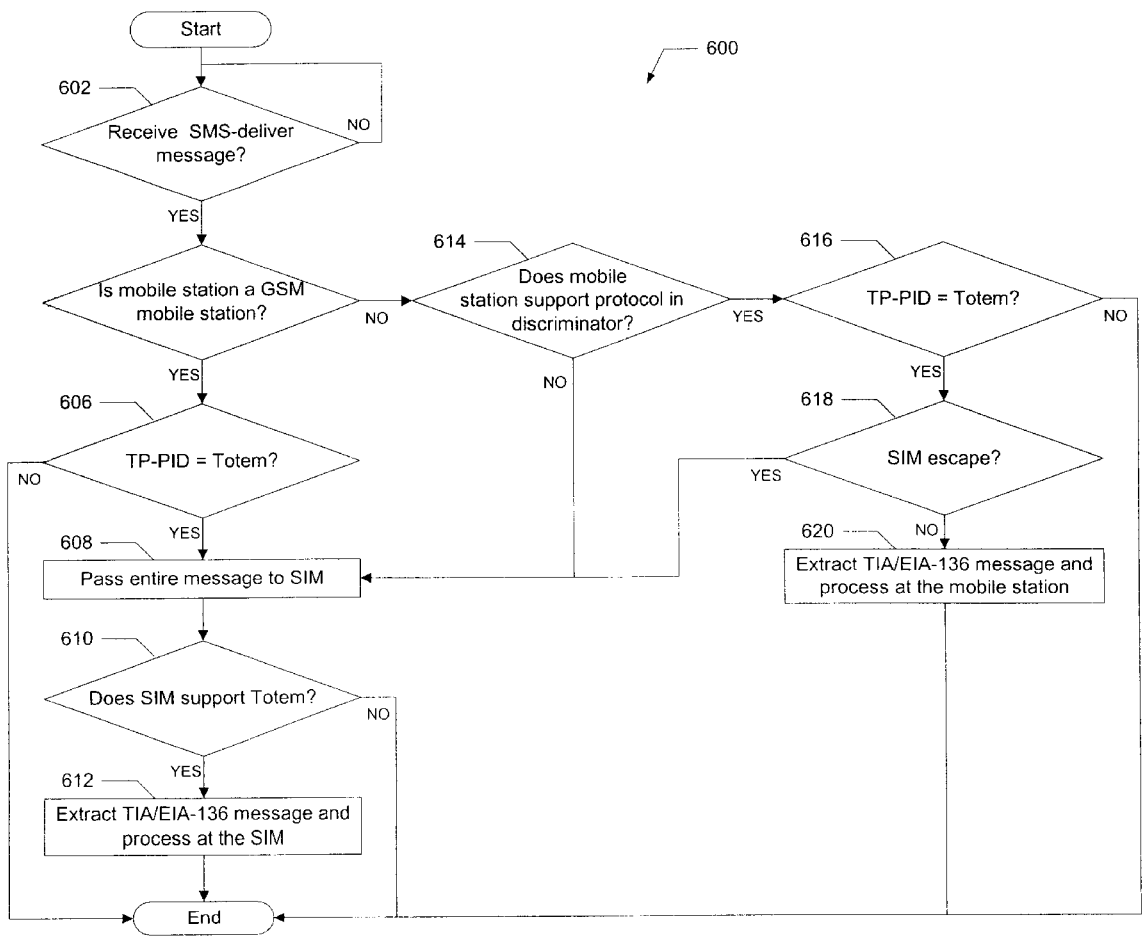
FIG. 6 is a flowchart of a method for processing an embedded message at a mobile station which includes a subscriber identity module.

A flowchart of a method 600 for processing an embedded message 510 at a mobile station 106, 206 which includes a subscriber identity module 108 is illustrated in FIG. 6. Generally, an embedded message 510 is included in an encapsulating message 104 and transmitted to the mobile station 106, 206 by the base station 102. Some embedded messages 510 are intended for processing by the mobile station 106, 206. Other embedded messages 510 are intended for processing by the SIM card 108 which is inserted in the mobile station 106, 206. Preferably, the encapsulating message 104 is a GSM compatible message. However, the embedded message 510 may not be a GSM compatible message. For example, the embedded message 510 may be a TIA/EIA-136 compatible message. Embedded messages 510 intended for processing-by the SIM card 108 are passed on to the SIM card 108 by the mobile station 106, 206.

The method 600 begins when an SMS-deliver message 104 is received by the mobile station 106, 206 (step 602). If the mobile station 106, 206 is a GSM mobile station 206, it checks the protocol identifier field 502 for an indication that the SMS-deliver message 104 is using the user data portion 504 to deliver a non-GSM teleservice message using a tunneling of teleservice message protocol (e.g., TP-PID= TOTEM) (step 606). If the protocol identifier field 502 does indicate that the SMS-deliver message 104 is using the user data portion 504 to deliver a non-GSM teleservice message using a tunneling of teleservice message protocol, the GSM mobile station 206 passes the entire SMS-deliver message 104 to the SIM card 108 for processing (step 608).

The SIM card 108 then checks the protocol identifier field 502 to determine if it supports the identified protocol (e.g., TOTEM) (Step 610). If the SIM card 108 determines that it does support the protocol identified by the protocol identifier field 502, the SIM card 108 extracts the embedded message (e.g., a TIA/EIA-136 message) and processes the embedded message using the SIM card CPU 416 (step 612). If the protocol identifier field 502 does not indicate that the SMS-deliver message 104 is using the user data portion 504 to deliver a non-GSM teleservice message using a tunneling of teleservice message protocol (step 606), or the SIM card 108 determines that it does not support the protocol identified by the protocol identifier field 502, the method 600 ends without processing the embedded message 510.

If the mobile station 106, 206 is a non-GSM mobile station 106, it checks if it supports the non-GSM protocol being used by the embedded message (e.g., TIA/EIA-136) as indicated in the protocol discriminator 506 (step 614). If the non-GSM mobile station 106 supports the non-GSM protocol being used by the embedded message, the non-GSM mobile station 106 checks the protocol identifier field 502 for an indication that the SMS-deliver message 104 is using the user data portion 504 to deliver a non-GSM teleservice message using a tunneling of teleservice message protocol (e.g., TP-PID=TOTEM) (step 616). If the protocol identifier field 502 does not indicate that the SMS-deliver message 104 is using the user data portion 504 to deliver a non-GSM teleservice message using a tunneling of teleservice message protocol, the method 600 ends without processing the embedded message 510. If the protocol identifier field 502 does indicate that the SMS-deliver message 104 is using the user data portion 504 to deliver a non-GSM teleservice message using a tunneling of teleservice message protocol, the GSM mobile station 206.checks the SIM escape flag 508 and/or other data (step 618).

If the SIM escape flag 508 is set or other data in the message is indicative of a SIM escape function, the non-GSM mobile station 106 passes the entire SMS-deliver message 104 to the SIM card 108 for processing (step 608). As described above, the SIM card 108 then checks the protocol identifier field 502 to determine if it supports the identified protocol (e.g., TOTEM) (Step 610). If the SIM card 108 determines that it does support the protocol identified by the protocol identifier field 502, the SIM card 108 extracts the embedded message (e.g., a TIA/EIA-136 message) and processes the embedded message using the SIM card CPU 416 (step 612). If the SIM escape flag 508 is not set (step 618), the non-GSM mobile station 106 extracts the embedded message (e.g., a TIA/EIA-136 message) and processes the embedded message using the mobile station 106 CPU 404 (step 620).

In summary, persons of ordinary skill in the art will readily appreciate that a method and apparatus for processing an embedded message at a mobile station which includes a subscriber identity module has been provided. Systems implementing the teachings of the present invention can enjoy the flexibility of inserting non-GSM SIM cards into GSM mobile stations while maintaining the compatibility and the ability to efficiently process teleservice messages.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for processing an embedded message at a GSM mobile station, the GSM mobile station including a subscriber identity module, the method comprising the steps of:
   receiving an encapsulating message at the GSM mobile station, the encapsulating message including the embedded message, the encapsulating message having a protocol discriminator indicative of a communications protocol;
   determining if a protocol identifier included in the encapsulating message is a predetermined protocol identifier, the protocol identifier identifying a particular protocol;
   transferring the encapsulating message to the subscriber identity module if the protocol identifier included in the encapsulating message is the predetermined protocol identifier;
   determining if the particular protocol identified by the protocol identifier is supported by the subscriber identity module;
   extracting the embedded message from the encapsulating message at the subscriber identity module if the particular protocol is supported by the subscriber identity module; and
   processing the embedded message at the subscriber identity module.

2. A method as defined in claim 1, wherein the step of receiving an encapsulating message at the GSM mobile station includes the step of receiving an SMS-deliver message.

3. A method as defined in claim 2, wherein the SMS-deliver message includes a protocol discriminator indicative of a TIA/EIA-136 protocol.

4. A method as defined in claim 2, wherein the step of receiving an SMS-deliver message includes receiving an SMS-deliver message having an escape flag, the escape flag being indicative of a desire to transfer the encapsulating message to the subscriber identity module.

5. A method as defined in claim 1, wherein the step of receiving an encapsulating message includes receiving an encapsulated message having an embedded TIA/EIA-136 message.

6. A method as defined in claim 1, wherein the step of determining if a protocol identifier included in the encapsulating message is a predetermined protocol identifier includes the step of determining if the protocol identifier included in the encapsulating message is indicative of a tunneling message.

7. A method for processing an embedded message at a non-GSM mobile station, the non-GSM mobile station including a subscriber identity module, the method comprising the steps of:
   receiving an encapsulating message at the non-GSM mobile station, the encapsulating message including a protocol identifier, a protocol discriminator, a subscriber identity module escape flag, and the embedded message;
   determining if the protocol discriminator is indicative of a protocol supported by the non-GSM mobile station;
   determining if the protocol identifier identifies a predetermined protocol if the protocol discriminator is indicative of the protocol supported by the non-GSM mobile station;
   determining if the subscriber identity module escape flag indicates a desire to transfer the encapsulating message to the subscriber identity module if the protocol identifier identifies a predetermined protocol;
   extracting the embedded message from the encapsulating message at the non-GSM mobile station if the subscriber identity module escape flag does not indicate a desire to transfer the encapsulating message to the subscriber identity module; and
   processing the embedded message at the non-GSM mobile station.

8. A method as defined in claim 7, further comprising the steps of:
   transferring the encapsulating message to the subscriber identity module if the protocol discriminator is indicative of a protocol not supported by the non-GSM mobile station;
   determining if the particular protocol identified by the protocol identifier is supported by the subscriber identity module;
   extracting the embedded message from the encapsulating message at the subscriber identity module if the particular protocol is supported by the subscriber identity module; and
   processing the embedded message at the subscriber identity module.

9. A method as defined in claim 7, further comprising the steps of:
   transferring the encapsulating message to the subscriber identity module if the subscriber identity module escape flag indicates a desire to transfer the encapsulating message to the subscriber identity module;
   determining if the particular protocol identified by the protocol identifier is supported by the subscriber identity module;
   extracting the embedded message from the encapsulating message at the subscriber identity module if the particular protocol is supported by the subscriber identity module; and
   processing the embedded message at the subscriber identity module.

10. A method as defined in claim 7, wherein the step of receiving an encapsulating message at the GSM mobile station includes the step of receiving a SMS-deliver message.

11. A method as defined in claim 7, wherein the step of determining if the protocol identifier identifies a predetermined protocol includes the step of determining if the protocol identifier is indicative of a tunneling message.

12. A method as defined in claim 7, wherein the step of determining if the protocol discriminator is indicative of a protocol supported by the non-GSM mobile station includes the step of determining if the protocol discriminator indicative of a TIA/EIA-136 protocol.

13. A GSM mobile station for processing an embedded message, the GSM mobile station comprising:
   a receiver for receiving an encapsulating message, the encapsulating message including a protocol identifier and the embedded message;
   a first memory for storing a first software program;
   a first processing unit operatively coupled to the receiver and the first memory, the first processing unit executing the first software program, the first processing unit receiving the encapsulating message from the receiver, the first processing unit determining if the protocol identifier is a predetermined protocol identifier;

a subscriber identification module operatively coupled to the first processing unit, the subscriber identification module including a second memory and a second processing unit, the second memory storing a second software program, the second processing unit executing the second software program, the subscriber identification module receiving the encapsulating message from the first processing unit if the protocol identifier is the predetermined protocol identifier, the second processing unit determining if a particular protocol identified by the protocol identifier is supported by the subscriber identity module, the second processing unit extracting the embedded message from the encapsulating message if the particular protocol is supported by the subscriber identity module, and the second processing unit processing the embedded message at the subscriber identity module.

14. A GSM mobile station as defined in claim 13, wherein the encapsulating message comprises an SMS-deliver message.

15. A GSM mobile station as defined in claim 14, wherein the SMS-deliver message includes a protocol discriminator indicative of a TIA/EIA-136 protocol.

16. A GSM mobile station as defined in claim 14, wherein the SMS-deliver message includes an escape flag, the escape flag being indicative of a desire to transfer the encapsulating message to the subscriber identity module.

17. A GSM mobile station as defined in claim 13, wherein the embedded message comprises a TIA/EIA-136 message.

18. A GSM mobile station as defined in claim 13, wherein the protocol identifier included is indicative of a tunneling message.

19. A non-GSM mobile station for processing an embedded message, the non-GSM mobile station comprising:

a receiver for receiving an encapsulating message, the encapsulating message including a protocol identifier, a protocol discriminator, a subscriber identity module escape flag, and the embedded message;

a first memory for storing a first software program;

a first processing unit operatively coupled to the receiver and the first memory, the first processing unit executing the first software program, the first processing unit receiving the encapsulating message from the receiver, the first processing unit determining if the protocol discriminator is indicative of a protocol supported by the non-GSM mobile station, the first processing unit determining if the protocol identifier identifies a predetermined protocol if the protocol discriminator is indicative of a protocol supported by the non-GSM mobile station, the first processing unit determining if the subscriber identity module escape flag indicates a desire to transfer the encapsulating message to the subscriber identity module if the protocol identifier identifies a predetermined protocol, the first processing unit extracting and processing the embedded message from the encapsulating message if the subscriber identity module escape flag does not indicate a desire to transfer the encapsulating message to the subscriber identity module; and a subscriber identification module operatively coupled to the first processing unit, the subscriber identification module including a second memory and a second processing unit, the second memory storing a second software program, the second processing unit executing the second software program, the subscriber identification module receiving the encapsulating message from the first processing unit, the second processing unit determining if a particular protocol identified by the protocol identifier is supported by the subscriber identity module, the second processing unit extracting and processing the embedded message from the encapsulating message if the particular protocol is supported by the subscriber identity module.

20. A method in a mobile station having a subscriber identity module, the method comprising:

receiving a message including a protocol identifier, a protocol discriminator at the mobile station, and a subscriber identity module escape flag;

determining if the protocol identifier identifies a predetermined protocol if the protocol discriminator is indicative of a protocol supported by the mobile station;

extracting information from the message at the mobile station if the subscriber identity module escape flag does not indicate that the message should be transferred to the subscriber identity module.

* * * * *